US007807040B2

(12) United States Patent
Legg et al.

(10) Patent No.: US 7,807,040 B2
(45) Date of Patent: Oct. 5, 2010

(54) RECOVERY PROCESS

(75) Inventors: Stuart Anton Legg, Newbury (GB); Christopher Peter Jones, Swindon (GB); Andrew Derek Turner, Abingdon (GB)

(73) Assignee: Biodynamics Research Limited, Rushden (GB)

( * ) Notice: Subject to any disclaimer, the term of this patent is extended or adjusted under 35 U.S.C. 154(b) by 1253 days.

(21) Appl. No.: 10/516,217

(22) PCT Filed: May 9, 2003

(86) PCT No.: PCT/GB03/01980

§ 371 (c)(1),
(2), (4) Date: Nov. 30, 2004

(87) PCT Pub. No.: WO03/102969

PCT Pub. Date: Dec. 11, 2003

(65) Prior Publication Data

US 2007/0114134 A1 May 24, 2007

(30) Foreign Application Priority Data

Jun. 1, 2002 (GB) ................................ 0212850.2

(51) Int. Cl.
*C02F 1/46* (2006.01)

(52) U.S. Cl. ...................................... 205/687; 205/742

(58) Field of Classification Search ................. 205/687, 205/742
See application file for complete search history.

(56) References Cited

U.S. PATENT DOCUMENTS 4,532,102 A * 7/1985 Cawley ...................... 376/185
4,874,485 A * 10/1989 Steele ........................ 205/688
5,790,964 A * 8/1998 Pourfarzaneh ............... 588/20
5,965,003 A 10/1999 Ozawa et al.
6,179,981 B1 * 1/2001 Masson et al. ................ 205/43

FOREIGN PATENT DOCUMENTS

| | | |
|---|---|---|
| EP | 0162536 | 11/1985 |
| EP | 0297738 | 1/1989 |
| GB | 2206341 | 1/1989 |
| GB | 2225340 A | 5/1990 |
| JP | A-S64-030689 | 2/1989 |
| JP | A-H09-500446 | 1/1997 |
| JP | A-2000-355784 | 12/2000 |

OTHER PUBLICATIONS

Dziewinski, J., et al., "Developing and Testing Electrochemical Methods for Treating Metal Salts, Cyanides, and Organic Compounds in Waster Streams", Waste Management, vol. 18, 1998, pp. 257-263, Elsevier Science Ltd., USA.

* cited by examiner

*Primary Examiner*—Arun S Phasge
(74) *Attorney, Agent, or Firm*—Barbara A. Wrigley; Oppenheimer Wolff & Donnelly, LLP

(57) ABSTRACT

The present invention provides a process for the recovery of radiolabelled isotopes from organic substances labelled or contaminated with one or more radiolabelled isotopes, which process comprises: i) adding organic substances labelled or contaminated with a radiolabelled isotope to an acidic aqueous electrolyte containing silver ions as an electrochemically regenerable primary oxidising species; ii) subjecting the acidic aqueous electrolyte to an electric potential; and iii) recovering the radiolabelled isotope from the products of the electrochemical process resulting from the application of the electric potential; wherein the process is carried out at a slight pressure depression.

7 Claims, 1 Drawing Sheet

RECOVERY PROCESS

Figure 1:
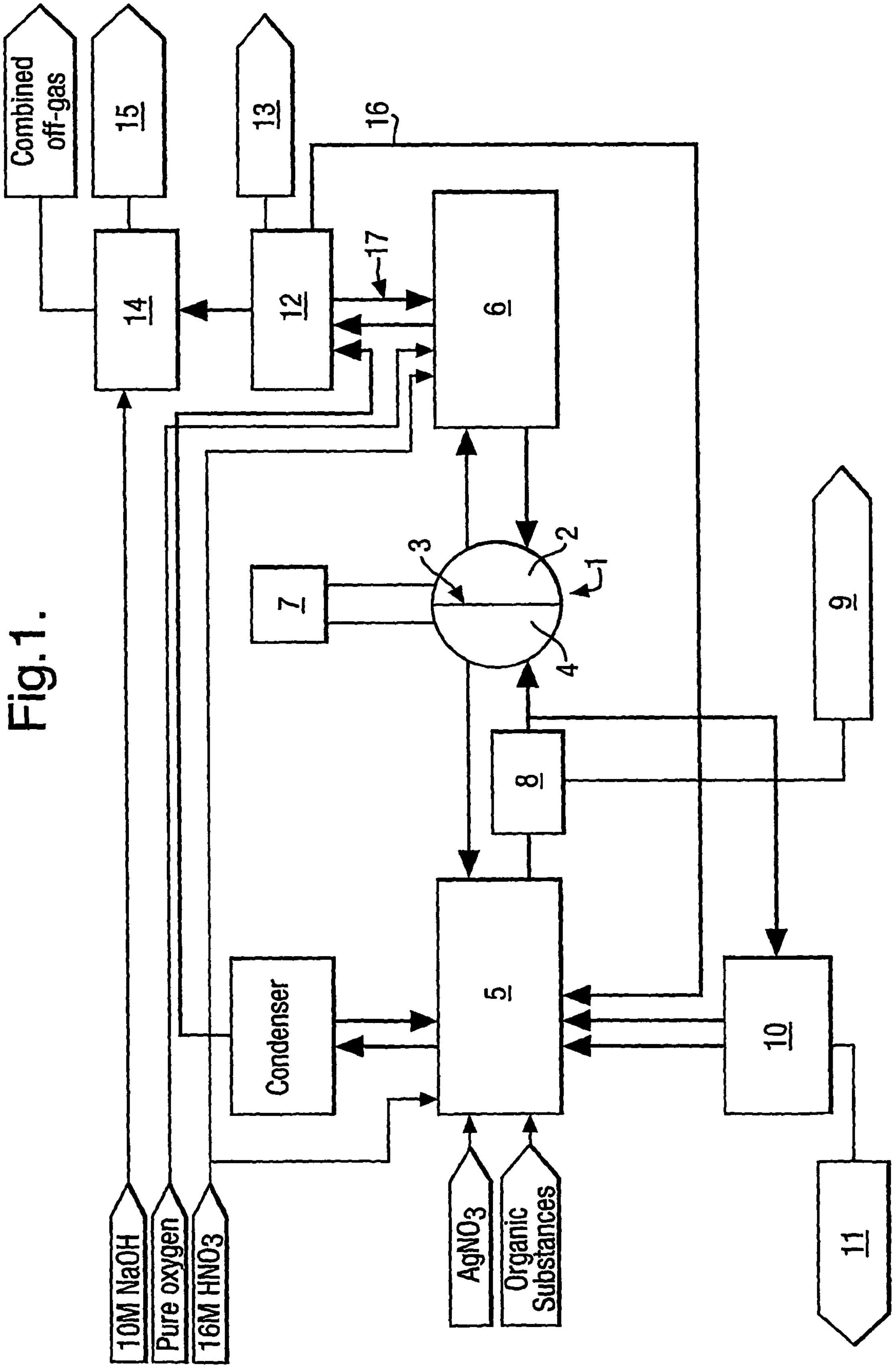

The present invention relates to a process for recovering specific atoms from isotopically labelled organic compounds, in particular radiolabelled compounds through electrochemical mineralisation. This can be used as a means not only of reducing the volume of the treated stream, but also as a means of mineralisation prior to disposal or also of recovery prior to recycling the isotopes eg after re-enrichment.

EP 0 297 738 discloses a method of treating waste matter including organic waste matter in an electrochemical cell.

The process of the present invention relates to recovering radiolabelled isotopes. The process can be applied to recovering a range of radiolabelled isotopes such as $^3H$, $^{14}C$, $^{32}P$, $^{33}P$, $^{35}S$, $^{36}Cl$, $^{131}I$, $^{40}K$ and $^{95-98}Tc$. In particular, the process is of interest in removing $^{14}C$ from organic substances containing or labelled with $^{14}C$, in particular drugs and waste products containing $^{14}C$. The invention also provides a process for removing $^3H$ from organic substances containing or contaminated with $^3H$.

$^{14}C$ is a radioactive nucleus. Labelling a drug with $^{14}C$ enables the study of absorption of the drug in a human or animal. This is particularly useful in the study of the behaviour of new drugs in the body. This leads to the production of significant quantities of $^{14}C$ labelled drugs and associated waste synthesis products containing $^{14}C$. The disposal of unused $^{14}C$ labelled drugs and the associated waste synthesis products cannot be achieved simply. Only a few nuclear waste processing plants accept $^{14}C$ and then only in the form of known compounds which are certified to be suitable for decay storage or reprocessing. However, typical drug syntheses result in new compounds and unknown combinations of waste synthesis products and solvents which are not suitable for reprocessing and recovery of $^{14}C$. The use of $^{14}C$ generally leads to $^{14}C$ containing materials which currently may be incinerated. This has the disadvantage that the $^{14}C$ is dispersed as $^{14}CO_2$ into the atmosphere. In future, incineration of $^{14}C$ containing compounds and wastes may be banned by legislation in many countries and therefore it is important to find an alternative way of treating organic substances containing $^{14}C$, so as to recover and trap the $^{14}C$ in a form suitable for safe decay-storage, or re-enrichment for recycling and re-use.

Similar problems also arise in relation to organic substances containing or contaminated with $^3H$. In particular, it is important to remove $^3H$ from organic substances. If it is possible to isolate $^3H$ from the organic substances in the form of $^3H_2O$ or $^3H^1HO$, then this can be diluted and dispersed into the environment.

The present invention provides a process for the recovery of radiolabelled isotopes from organic substances labelled or contaminated with one or more radiolabelled isotopes, which process comprises:

i) adding organic substances labelled or contaminated with a radiolabelled isotope to an acidic aqueous electrolyte containing silver ions as an electrochemically regenerable primary oxidising species;

ii) subjecting the acidic aqueous electrolyte to an electric potential; and iii) recovering the radiolabelled isotope from the products of the electrochemical process resulting from the application of the electric potential;

wherein the process is carried out at a slight pressure depression.

The electrochemical steps of this process may also be referred to as the $Ag^{++}$ process.

Radiolabelling is the replacement of an atom in a molecule or compound by a radioactive isotope (radioisotope).

The process of the invention may be used to recover one or more of a range of radioisotopes. For example radioisotopes of phosphorous, sulphur, hydrogen, carbon, chlorine, or iodine may be recovered. The exact process for recovering the radioisotope varies according to the radioisotope(s) used. The process may also be applied to recovering radioisotopes of potassium or technetium when present in organic substances, for example as organocomplexes. In one embodiment of the present invention, the radioisotopes are one or more of $^3H$, $^{14}C$, $^{32}P$, $^{33}P$, $^{35}S$, $^{36}Cl$, $^{131}I$, $^{40}K$ and $^{95-98}Tc$, preferably one or more of $^3H$, $^{14}C$, $^{32}P$, $^{33}P$ and $^{35}S$.

In particular, the present invention provides a process for the recovery of $^{14}C$ from organic substances labelled or contaminated with $^{14}C$, which process comprises:

i) adding organic substances labelled or contaminated with $^{14}C$ to an acidic aqueous electrolyte containing silver ions as an electrochemically regenerable primary oxidising species;

ii) subjecting the acidic aqueous electrolyte to an electric potential;

iii) containing the off-gas produced from the anolyte resulting from the electric potential;

iv) optionally converting any CO in the off-gas to $CO_2$;

v) absorbing $CO_2$ from the off-gas using one or more alkaline absorbers.

The organic substances will usually be solids or liquids, although the present invention could also be applied to labelled gases. The organic substances may be compounds, such as drugs, that have been labelled with a radioisotope, such as $^{14}C$. Other organic substances that may be processed are waste products including solvents that have become contaminated with a radioisotope, for example during the synthesis of radiolabelled drugs. The metabolites of radiolabelled drugs and fluids containing such metabolites may also be subjected to the process of the present invention. Preferably the organic substance or substances are labelled with a radioactive isotope. Typically, organic substances that are contaminated with radiolabelled compounds are organic substances that are mixed with radiolabelled organic substances.

The acidic aqueous electrolyte preferably comprises nitric acid and silver ions. However, methanesulphonic acid may be used as an alternative to nitric acid in some cases.

In one embodiment, the organic substances are subjected to high shear mixing with the anolyte in a vessel separate from the electrical cell, anolyte being circulated between the said vessel and the electro-chemical cell. Alternatively or additionally the waste matter may be shredded prior to mixing with the anolyte, and/or subjected in the said vessel to insonation with high-energy ultrasound. Large fragments are prevented from passing into the electrochemical cell by use of a metal mesh screen (made of eg titanium).

If necessary, feed of anolyte from the said vessel to the electrochemical cell is via a solid concentration process, a high solid fraction being returned to the vessel and a low solids fraction passing to the electrochemical cell.

Insoluble organic substances are conveniently supplied as slurries of solids suspended in water.

The present invention can be used to recover $^{14}C$ from compounds and waste products or mixtures containing any amount of $^{14}C$. Typically substances where $^{14}C$ is present as from ppm to 100% of the carbon may be processed. The process is more economic where large amounts, for example 10% to 100%, of the carbon present is $^{14}C$ but the process may used for any amount of $^{14}C$.

The silver ions in the acidic aqueous electrolyte act as an electrochemically regenerable primary oxidising species.

The silver ions act to decompose the organic substances. When the electric potential is applied to the electrolyte a secondary oxidising species is produced from the interaction of the primary oxidising species and the acidic aqueous electrolyte. The secondary oxidising species is predominantly responsible for the decomposition of the organic substances added to the electrolyte. The primary oxidising species formed as a result of the reduction of the secondary oxidising species by reaction with the organic substances is regenerated by the electric potential. This process has already been described in the literature, for example, in EP-A-0 297 738.

Advantageously, the electrolyte may also include cobalt ions.

Generally, the acidic aqueous electrolyte is at a temperature of from room temperature to 95° C., preferably 50 to 95° C., more preferably 50 to 90° C. while the electric potential is applied. However, for some applications a temperature of from 55 to 80° C. or from 70 to 90° C. may be used to improve the process. Some organic substances decompose successfully at 55° C. Other substances decompose suitably at room temperature, in particular more reactive organic substances.

The organic substances may be added to the acidic aqueous electrolyte continuously or in a batch wise manner at a rate compatible with the decomposition rate of the previously added organic substances.

Preferably the nitric acid has a concentration of from 4 M to 16 M. However the electrolyte may comprise a mixture of nitric acid and sulphuric acid or a mixture of nitric acid and phosphoric acid.

Conveniently, the organic substances are decomposed by the secondary oxidising species to generate components which are preferably non-toxic, e.g. $CO_2$ and water. The process is operated under a slight pressure depression in order to prevent leakage of radioisotope containing gas, e.g. $^{14}CO_2$, into the atmosphere. A slight pressure depression is a reduced pressure for reducing the risk of leakage of radioisotope containing gas to the atmosphere. For example, a pressure reduction of 2 cm water gauge or more. Typically a pressure reduction of 2 cm water gauge is sufficient.

Heteroatoms in the organic substances, such as phosphorous and sulphur form other products in the electrochemical process. For example, sulphur and phosphorous typically remain in the anolyte solution from which they can be removed by distillation and evaporation processes. Chlorine and iodine react with the silver ions to form their silver salts which precipitate in the anolyte and can be removed by filtration devices. These processes can be used to recover the radioisotopes of these elements. Metal ions such as potassium and technetium remain in the anolyte solution and can be recovered from the solution by chemical techniques if required, for example where radioisotopes have been used.

The application of the electric potential results in the formation of an anolyte and catholyte. CO and $CO_2$ are produced from the anolyte. The fraction of CO is typically 0-10% of the carbon content of the feed material. By adjusting the feed rate to ensure that the anolyte environment is maintained predominantly oxidising, this may be maintained at <0.5%, although the current utilisation efficiency will be lower than the maximum achievable as a result. The process also produces $NO_x$ at the cathode. One advantage of this process is thus that these gases are produced separately at the anode and cathode and can therefore be removed from the apparatus as separate gas streams if required.

The CO/$CO_2$ gas stream can be fed to a unit for converting CO to $CO_2$. This can be achieved in a number of ways. Possible processes include catalytic oxidation (eg by tin oxide at room temperature) in the presence of oxygen, reaction with mild aqueous oxidising agents (such as $PdCl_2$), reaction with $I_2O_5$ which is reduced to iodine, passing the gas stream over a heated oxide such as lead oxide or forming CO complexes (eg with haeme-type compounds of iron) which can then be returned to the anolyte of the $Ag^{++}$ system and subsequently oxidised and converted to $CO_2$.

As some intermediates in the progressive oxidation of the organic feed to $CO_2$ may be cationic or uncharged species under the anolyte conditions, small quantities may be transferred from the anolyte to catholyte. These may be transferred back to the anolyte for subsequent oxidation, either in a continuous bleed system, in batch mode or by simple cell polarity reversal.

Other intermediates may be volatile organic species (VOCs) which at the temperature of operation of the $Ag^{++}$ process may have not insignificant vapour pressures. These will be lost to the off-gas system, unless they are condensed and returned to the anolyte. This is normally achieved by a two-stage condenser, where initially water is recovered at 2° C., and then temperatures down to −10° C. can be used for VOC capture without risk of icing.

Alternatively, a catalytic oxidiser can be used to convert VOCs into $CO_2$ in the excess of $O_2$ present in the off-gas, prior to the absorption stage.

The resulting $CO_2$ is then fed to one or more alkaline absorbers. Typically a caustic solution such as $Ba(OH)_2$ or $Ca(OH)_2$ is used resulting in the production of $BaCO_3$ or $CaCO_3$ respectively. Sodium hydroxide can also be used as long as the carbonate is subsequently precipitated. The apparatus containing the alkaline absorber should be designed in such a way that the apparatus does not become blocked by the formation of the precipitated carbonate. For example, use of a bubbler or vortex system may be advantageous. Multiple caustic or alkaline absorbers can be used in sequence in order to ensure that a sufficient proportion of $^{14}CO_2$ has been absorbed so as to give the required decontamination factor. Typically, this will be in excess of 100, possibly in excess of 1,000.

Optionally, the stream of CO and $CO_2$ gases may be separated or purified using gas chromatography. This technique can be used to separate carbon monoxide from carbon dioxide and can also be used to separate the gases according to the different isotopes of carbon. Thus this technique can separate $^{12}CO_2$ from $^{14}CO_2$.

Air or oxygen may be passed into the catholyte vessel to at least partially convert nitrogen oxides produced from the nitric acid during the electrolysis process back to nitric acid. The nitric acid may also be recovered by extracting and scrubbing any $NO_X$ produced at the cathode using dilute nitric acid or water followed by concentration and recycling to the catholyte. Hydrogen peroxide may also be used as a scrub liquor to produce a nitric acid stream. A small amount of $NO_X$ is also typically produced at the anode. In order to remove these gases from the gas stream produced at the anode these gases may also be passed through a scrubbing process. In some cases the gas streams from the anode and cathode may be combined and then passed through a scrubber in order to remove the $NO_X$ gases before CO conversion and $CO_2$ absorption take place.

In one embodiment, the process also comprises a step whereby after application of the electric potential at least a portion of the catholyte arising therefrom is fed to a boiler and the vapour recovered from a fractionating condenser as an acid rich and water condensate streams. The condensate can be used as the scrub liquor for the reformation of $NO_x$ by reaction with oxygen in a packed column being converted substantially to nitric acid as it descends in the packed column.

The process may also include an additional step prior to applying an electric potential to the electrolyte, in which the organic substances are partially decomposed or treated in order to render them more soluble in the electrolyte. For example, the additional step may comprise contacting the organic substances with an acid such as nitric acid while heating the acid, in which case the organic substances may then subsequently be cooled to the appropriate temperature at which the electric potential will be applied. Where the organic substances include solids, this step may include shredding, breaking up or finely dividing the solid.

Typically the anolyte and catholyte are separated by a separator to prevent bulk mixing of the two electrolytes. This might comprise a glass sinter or a ceramic material, but any suitable porous separator material with the required porosity and chemical resistance may be used (e.g. microporous PTFE, PVDF). Alternatively, a non-porous ion-permeable membrane such as sulphonated fluoropolymer ("Nafion") or similar membrane may be used.

The electrochemical cell typically contains a means of agitation of immiscible organic feed with the anolyte solution (e.g. an impeller) and a means of temperature control (e.g. a heat exchanger). The heat exchanger (which may be by means of the electrolyte vessel walls) can be used to heat or cool the cell according to the temperature conditions that are to be established or maintained in the cell.

In use the electrolyte is generally mixed by the impeller with the organic substances that are to be decomposed. Alternatively, ultrasonics and/or fluidic mixing can be used to maximise the interfacial contact area between aqueous and organic phases. The organic substances are introduced via an inlet into the cell either continuously or batch wise and drawn downwards towards the impeller and caused to mix with the electrolyte. Some organic substances have a density such that they will form a layer on top of the electrolyte. In that case the impeller is arranged so that it draws the organic substance into the electrolyte.

In a power fluidic mixer, liquid organic feed can be blended with recirculated anolyte as part of the recirculation loop. This can be combined with ultrasonic agitation e.g. as part of the vortex mixer.

Ultrasonic agitation can be applied as part of the anolyte recirculation loop by means of a insonation flow reactor, where ultrasonic transducers are fixed to the walls of the pipe of the flow vessel.

The anode may be constructed of, for example platinum, platinum-coated titanium or iridium oxide-coated titanium which are stable under the acidic oxidizing conditions found within the anolyte. The cathode may be constructed of platinum, platinum-coated titanium, gold, gold-plated titanium or stainless steel. The choice of the material is dictated by resistance to corrosion in nitric acid, cost and availability. The use of platinum or gold can be advantageous as this reduces the polarisation of cathode and thereby the cell voltage with a resultant saving in the operating costs.

The invention provides, in another of its aspects, apparatus for use in the treatment of organic substances labelled or contaminated with radioisotopes such as $^{14}C$, which apparatus comprises an electrochemical cell having a cathode, an anode, an ion-permeable separator between the anode and the cathode forming an anode region and a cathode region within the cell, and acidic aqueous electrolyte containing silver ions, means for mixing the organic substances continuously or periodically with anolyte from the electrochemical cell and at least one gas treatment component for removing volatile organic compounds which is connected to treat off-gas from the apparatus, which gas treatment component is typically further connected to at least one alkaline absorber for absorbing $CO_2$.

Preferably the acidic aqueous electrolyte comprises nitric acid and silver ions.

Preferably, an anolyte vessel is connected for circulation of anolyte between the anolyte vessel and the anolyte region of the electrochemical cell, a catholyte vessel is connected for circulation of catholyte between the catholyte vessel and catholyte region of the electrochemical cell. A connection may also be provided for extracting and feeding a proportion of catholyte from the catholyte vessel into the anolyte vessel to compensate for transfer of silver, water and organic molecules from anolyte to catholyte in the electrochemical cell. This may be either by continuous or batch transfer, or reversal of the electrolyte solutions.

If required, the said connection between the catholyte vessel and the anolyte vessel may include means for effecting a solid concentration process, a high solids fraction being fed into the anolyte vessel and low solids fraction being returned to the catholyte vessel. Increased effectiveness of the solids concentration process may be achieved by including a cooler positioned so that the said extracted catholyte is cooled prior to being subjected to said solids concentration process.

Preferably, a high shear or ultrasonic mixer is provided for mixing the organic substances with the anolyte supplied to the anolyte vessel from the electrochemical cell, and a connection for feeding anolyte from the anolyte vessel to the electrochemical cell includes means for effecting a solid concentration process, a high solids fraction being returned to the vessel and a low solids fraction passing to the electrochemical cell. This may simply be a titanium mesh screen, or possibly a hydrocyclone. This serves to minimise transfer of solid organic matter into the electrochemical cell itself and thus reduces the risk of such matter fouling the electrochemical cell and the membrane thereof in particular.

In a further embodiment, under acidic conditions, cerium, cobalt, chromate or permanganate might be used as an alternative to silver as the mediating oxidizing species to transfer the oxidizing power from the cell anode to organic species being oxidised through their respective redox couples.

Under caustic electrolyte conditions, water-soluble organics can be effectively oxidised at the anode to carbonate without the need of a mediating redox couple. Anode coatings of AgO and $PbO_2$ may also be used in addition to those listed earlier. The oxidised carbon remains trapped within the electrolyte as bicarbonate/carbonate without the formation of $CO_2$. Due to the limited solubility of $NaHCO_3$, crystals may form if the solubility limit is exceeded. The $^{14}C$ can subsequently be recovered as an insoluble carbonate (eg $BaCO_3$) by addition of a barium salt. In addition, alkali soluble redox systems can be used e.g. ruthenium ions to enhance the efficiency of the oxidation process particularly for immiscible organic phases. Other couples such as ferrate, chromate, permanganate could also be used, although these have the disadvantage of insoluble reduction products under alkaline conditions.

A typical apparatus for the process of the present invention is described, by way of example only, with reference to FIG. 1. An electrochemical cell is shown diagrammatically at 1, and has a cathode compartment 2 displaced by a separator 3 from an anode compartment 4. The anolyte circulates between the anode compartment 4 and the anolyte tank 5. The catholyte circulates between the cathode compartment 2 and the catholyte tank 6. The electrochemical cell is provided with a DC power supply 7.

The reagents 16M nitric acid and silver nitrate are fed into the anolyte tank 5. The organic substances for treatment are also supplied to the anolyte tank 5. Any gases formed during the reaction of the organic substances with the anolyte are sent to the condenser. Any solids that precipitate in the anolyte tank 5 are removed by the hydrocyclone unit 8 on recirculation to the anolyte compartment 4. The isolated solids are then removed from the system entirely (9). Any products of the reaction process in the anolyte tank that remain in solution are removed using distillation and/or evaporation columns 10. A byproduct of these columns may include 16M nitric acid for reuse or disposal (11).

16M nitric acid and pure oxygen are provided to the catholye tank 6. Gases formed in reactions taking place in the catholyte tank are passed to the $NO_x$ reformer 12. In the $NO_x$ reformer, nitrogen oxides are reacted with oxygen to produce nitric acid. The products from the $NO_x$ reformer are dilute nitric acid which is removed from the system (13), and more concentrated nitric acid which is recycled (16,17) to the catholyte and anolyte tanks.

The gases from the $NO_x$ reformer are passed to an off-gas scrubber unit 14 where carbon dioxide reacts with sodium hydroxide. The off-gas scrubber is provided with a source of 10 M sodium hydroxide. The products sodium hydroxide, sodium carbonate and sodium nitrates are removed from the off-gas scrubber (15). The combined off-gases are then removed from the scrubber. The percentage of radioisotopes such as $^{14}C$ is typically negligible in such off-gases.

The present invention also provides a process for the removal of $^3H$ from organic substances labelled or contaminated with $^3H$, which process comprises:

i) adding organic substances labelled or contaminated with $^3H$ to an acidic aqueous electrolyte comprising nitric acid and silver ions;

ii) subjecting the acidic aqueous electrolyte to an electric potential;

iii) recovering $^3H$ from the electrolytes resulting from the electric potential by distilling the electrolyte and condensing the $^3H$ as $^3H_2O$ or $^3H^1HO$.

The invention claimed is:

1. A process for the recovery of 14 C from organic substances labelled or contaminated with 14 C comprising:

i) adding organic substances labelled or contaminated with 14 C to an acidic aqueous electrolyte containing silver ions as an electrochemically regenerable primary oxidizing species;

ii) subjecting the acidic aqueous electrolyte to an electric potential;

iii) containing the off-gas produced from an anolyte resulting from the electric potential;

iv) optionally converting any CO in the off-gas to CO2;

v) absorbing CO2 from the off-gas using one or more alkaline absorbers; and vi) recovering the radiolabelled isotope from the products of the electrochemical process resulting from the application of the electric potential; wherein the process is carried out at a slight pressure depression.

2. A process according to claim 1 wherein the acidic aqueous electrolyte comprises silver ions and nitric acid.

3. A process according to claim 1 wherein the organic substances are drugs labelled with 14 C.

4. A process according to claim 1 wherein the alkaline absorber is Ba (OH)2 or Ca (OH)2.

5. A process according to claim 1 wherein the organic substances are subjected to a pre-treatment step comprising heating the organic substances in nitric acid to a temperature at which the organic substances are partially decomposed or rendered more soluble in the electrolyte.

6. The process of claim 1 wherein subjecting the acidic aqueous electrolyte to an electric potential further comprises adding the acidic aqueous electrolyte to an electrochemical cell having a cathode, an anode, an ion-permeable separator between the anode and the cathode forming an anode region and a cathode region within the cell, and mixing the organic substances continuously or periodically with anolyte from the electrochemical cell.

7. A process according to claim 6 wherein gas streams produced at the anode and cathode are combined and passed through a scrubber to remove NOx.

* * * * *